United States Patent
Seyfang et al.

(10) Patent No.: US 7,301,454 B2
(45) Date of Patent: Nov. 27, 2007

(54) SENSOR SYSTEM

(75) Inventors: George Reginald Seyfang, Preston (GB); Geoffrey Salkeld, Nr. Preston (GB); Christopher John Hunter, Preston (GB); Neil John Calder, Preston (GB)

(73) Assignee: BAE Systems plc, London (GB)

( * ) Notice: Subject to any disclaimer, the term of this patent is extended or adjusted under 35 U.S.C. 154(b) by 179 days.

(21) Appl. No.: 10/499,007

(22) PCT Filed: Dec. 17, 2002

(86) PCT No.: PCT/GB02/05713

§ 371 (c)(1),
(2), (4) Date: Mar. 10, 2005

(87) PCT Pub. No.: WO03/056279

PCT Pub. Date: Jul. 10, 2003

(65) Prior Publication Data

US 2005/0156751 A1    Jul. 21, 2005

(30) Foreign Application Priority Data

Dec. 21, 2001  (EP) .................................. 01310836
Dec. 21, 2001  (GB) .................................. 0130749.5

(51) Int. Cl.
G08B 1/08    (2006.01)
(52) U.S. Cl. .................. 340/539.26; 340/447; 310/339
(58) Field of Classification Search ........... 340/539.26, 340/442, 447, 545.5; 73/1.48, 146.3, 146.5; 310/311, 339
See application file for complete search history.

(56) References Cited

U.S. PATENT DOCUMENTS

| | | | |
|---|---|---|---|
| 3,757,695 A | | 9/1973 | Fisher |
| 4,160,234 A | * | 7/1979 | Karbo et al. ................. 340/443 |
| 4,275,658 A | | 6/1981 | Gottron et al. |
| 4,384,482 A | * | 5/1983 | Snyder ....................... 73/146.5 |
| 5,781,104 A | * | 7/1998 | Huang ......................... 340/442 |
| 6,011,346 A | * | 1/2000 | Buchanan et al. .......... 310/339 |
| 6,175,302 B1 | * | 1/2001 | Huang ......................... 340/442 |

FOREIGN PATENT DOCUMENTS

| | | |
|---|---|---|
| AU | B-22118/92 | 9/1992 |
| DE | 35 20 899 A | 1/1986 |
| DE | 19728392 A | 1/1999 |
| EP | 0871018 A1 | 4/1998 |
| EP | 1 022 702 A | 7/2000 |
| GB | 2231407 A | 11/1990 |
| WO | WO 00/09974 A1 | 2/2000 |

* cited by examiner

Primary Examiner—Phung T. Nguyen
(74) Attorney, Agent, or Firm—Crowell & Moring LLP

(57) ABSTRACT

The invention provides apparatus having a sensor system for providing sensor information for a monitoring, control or other operating function of the apparatus. The sensor system comprises: a transducer (16) adapted to be responsive to a predetermined environmental characteristic of the apparatus for providing an electrical output, and means (18) adjacent to the transducer to accentuate the said characteristic. At least one sensor (20) is arranged to be operated by power derived from the electrical output for generating a detection signal, and means (38, 40) arranged to be operated by power derived from the electrical output and responsive to the detection signal are also provided for communicating sensor information to a processing unit remote from the sensor system and associated with the said function.

20 Claims, 3 Drawing Sheets

P = Piezo-electric generator
SS = Sensor system

SENSOR SYSTEM

This invention concerns a sensor system for providing sensor information for a monitoring, control or other operating function of an apparatus, in particular a land, sea or air vehicle.

BACKGROUND OF THE INVENTION

It is well known in vehicles such as ships and aircraft to employ a plurality of sensors connected together and to a remote central control unit by means of wired connections for supplying sensor information for a monitoring, control or other operational function of the vehicle. Such sensor systems are complicated and expensive to install, in view of the need for complex wiring systems for supplying power to the sensors and for transmitting sensor information to the control unit from the sensors. Moreover, such systems are costly to maintain, in view of the need to monitor the integrity of the individual wired connections and/or to build in sufficient redundancy to allow for the failure of such connections without impairing the overall functioning of the system. Such systems furthermore require a substantial central power source, which may be costly to provide and may result in undesirable bulk in an environment where weight and space savings are at a premium.

SUMMARY OF THE INVENTION

It is an aim of the present invention to overcome these problems by providing localised power generation for a sensor system in such apparatus.

A further aim of the invention is to provide an effective and inexpensive sensor system having local power generators arranged to exploit the environmental characteristics at each sensing location for providing the small amounts of electrical power required.

Another aim of the invention is to employ the characteristics of a boundary layer of fluid flowing over a surface of the apparatus or vehicle in which the sensor system may be installed for generating the electrical power for operating the or each of the sensors.

A further aim of the present invention is to provide a sensor system in such an apparatus or vehicle with a remote communication arrangement for transmitting control information to and receiving detection information from the sensor system.

Still another aim of the present invention is to provide such a sensor system in a land, sea or air vehicle, particularly an aircraft.

In accordance with the invention there is provided an apparatus having a sensor system for providing detection information for a monitoring, control or other operating function of the apparatus, the sensor system comprising:

- a transducer adapted to be responsive to a predetermined environmental characteristic of the apparatus for providing an electrical output, means being provided to accentuate the said characteristic adjacent to the transducer,
- at least one sensor arranged to be operated by power derived from the electrical output for generating a detection signal, and
- means arranged to be operated by power derived from the electrical output and responsive to the detection signal, for communicating sensor information to a processing unit remote from the sensor system and associated with the said function.

The transducer advantageously provides a localised power generator and is preferably a solid-state device, such as a piezo-electric or thermoelectric device.

The transducer may be arranged to be responsive to at least one of: a boundary layer characteristic of fluid flowing over a surface of the apparatus, a structural characteristic of the apparatus, vibration in the apparatus, electromagnetic radiation, and temperature or temperature difference within and/or adjacent to the apparatus.

Conveniently, the transducer may itself constitute a sensor for measuring one of these characteristics.

In a preferred form of the invention, the transducer is adapted to be responsive to pressure, temperature gradients or differences, flow or turbulence in a boundary layer of fluid, such as air or water, flowing past a surface of the apparatus. More particularly, the transducer is advantageously arranged to be responsive to variations in one of these characteristics.

Advantageously, in this event, a small formation, such as a protrusion, may be provided on or in a surface of the apparatus upstream of the transducer in order to accentuate fluctuations or variations in the fluid flow across the surface.

In another preferred form of the invention, the transducer is arranged to be responsive to structural vibrations of the apparatus. For example, such vibrations may be due to the turbulence of a boundary layer of fluid flowing past a surface of the apparatus or they may be due to vibrations of machinery associated with the apparatus or to frictional engagement of parts of the apparatus with contact surfaces in the environment.

The at least one sensor may measure external characteristics of the apparatus, such as turbulence, velocity and incident radiation, or internal characteristics such as vibration, strain, electrical resistance and temperature, or cross boundary characteristics.

In a preferred form of the invention described below, the transducer is provided on or embedded within a surface of the apparatus.

In this instance, the or each sensor may also be provided on or embedded within the same surface or an opposite surface of the apparatus.

Some or all of the parts of the sensor system, including electrical connections, may be formed on the surface(s) by surface deposition techniques, such as printing techniques.

Advantageously, the sensor system also includes means for communicating with a remote control unit, for example employing electromagnetic radiation. Such communication means may conveniently comprise short range wireless data links.

The invention in its preferred form described herein makes use of the characteristics of a boundary layer of fluid flowing past a surface of a vehicle for supplying sensor information. For example, the sensor system could be applied to the wing surface of an aircraft for providing sensor information for a monitoring or control function of the aircraft. Alternatively, the sensor system could be employed in a combustion cylinder of an engine of a vehicle in order to sense accurately the conditions in the combustion chamber, for controlling the supply of fuel for example.

Likewise, the invention could be applied to the monitoring of conditions within pipelines in the gas, water and oil industries by employing the characteristics of a boundary layer of fluid flowing along the internal surface of a pipe.

According to another aspect of the present invention, there is provided a sensor system for providing detection information for a monitoring, control or other operational system of an apparatus, comprising:

a transducer adapted to be responsive to a predetermined environmental characteristic of the apparatus, such as fluid flow over a surface of the apparatus, for providing an electrical output, and at least one sensor arranged to be operated by power derived from the electrical output for generating a detection signal, means being provided to accentuate the said characteristic adjacent to the transducer.

According to another aspect of the present invention, there is provided a device for generating electrical power, said device being associated in use with a surface subjected to fluid flow there-past, comprising:

a transducer adapted to be responsive to a predetermined characteristic of a boundary layer of the fluid for providing an electrical output, and means for supplying electrical power derived from the electrical output, means being provided to accentuate the said characteristic adjacent to the transducer.

Other objects, advantages and novel features of the present invention will become apparent from the following detailed description of the invention when considered in conjunction with the accompanying drawings.

DETAILED DESCRIPTION OF THE INVENTION

Figure 1:
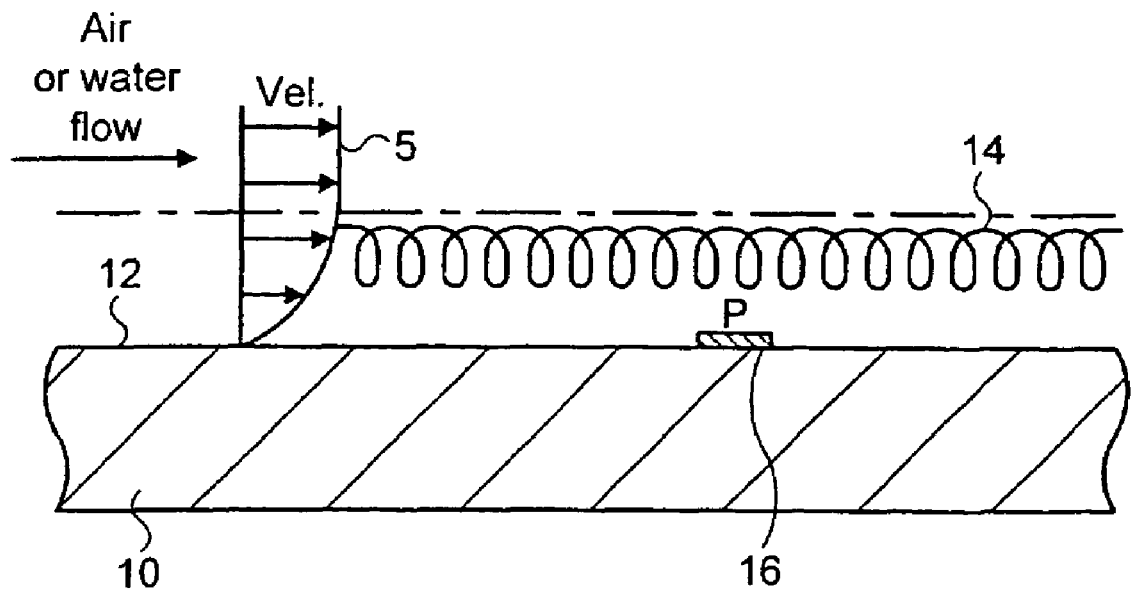
FIG. 1 is a diagrammatic view illustrating the operation of a local power generator of a sensor system according to the present invention.

Referring initially to FIG. 1, a local power generator for use in the sensor system of the invention will first be described. As shown in FIG. 1, a panel 10 of a vehicle, such as an aircraft, has an external surface 12 which is subject to a flow of fluid thereover in use due to the movement of the vehicle. For example, the panel 10 may comprise the skin of an aircraft wing, which is subject to a flow of air during manoeuvring on the ground, take off, flight and landing. As is well known, fluid flow past the panel 10 in these conditions will generate a boundary layer 14 of turbulence adjacent the panel 10 as illustrated.

Mounted on the surface 12, or alternatively embedded within the panel 10 so as to be proximate to or flush with the surface 12, is a solid state transducer 16, which in the present instance is a piezo-electric device. This piezo-electric device 16 is subject in use to the turbulence of the air in the boundary layer 14 and is arranged to be responsive to such turbulence in order to generate an electrical output. As can be appreciated, the velocity of the air flow past the panel 10 will affect the level of turbulence in the boundary layer 14 and hence the level of the electrical output from the piezo-electric device 16. In effect, the piezo-electric device 16 responds to pressure fluctuations in the boundary layer 14 and the energy of these is converted into relatively small amounts of electrical power.

Figure 2:
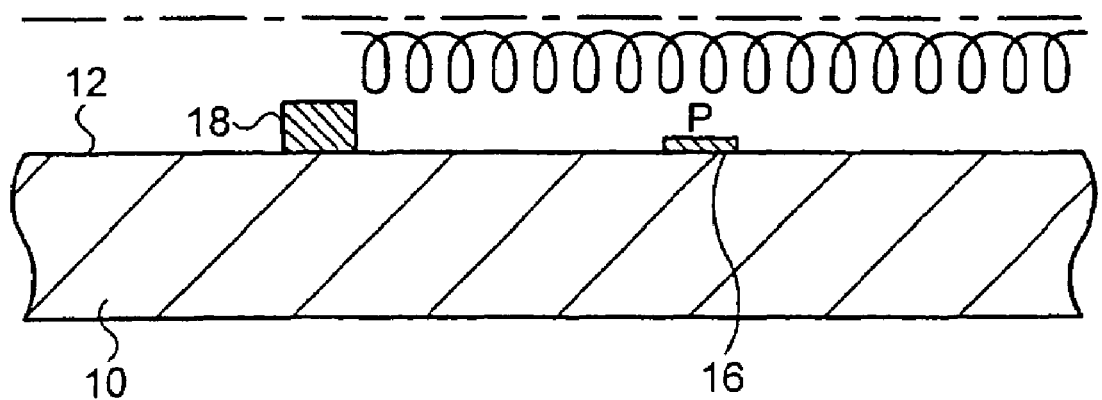
FIG. 2 is a diagrammatic view corresponding to FIG. 1 and showing a modification of the arrangement of FIG. 1.

It is possible to accentuate the turbulence in and hence the pressure fluctuations of the boundary layer 14 by an arrangement such as that illustrated in FIG. 2, according to which a formation comprising a protrusion 18 is provided on or in the surface 12 of the panel 10 upstream of the piezo-electric device 16 so that the boundary layer 14 encounters an obstruction and is further disturbed in its flow. As illustrated, the protrusion 18 is in the form of a rib of rectangular section mounted on the surface 12, but alternative formations of any shape may be employed so long as the effect is to increase turbulence in the vicinity of the device 16.

Figure 3:
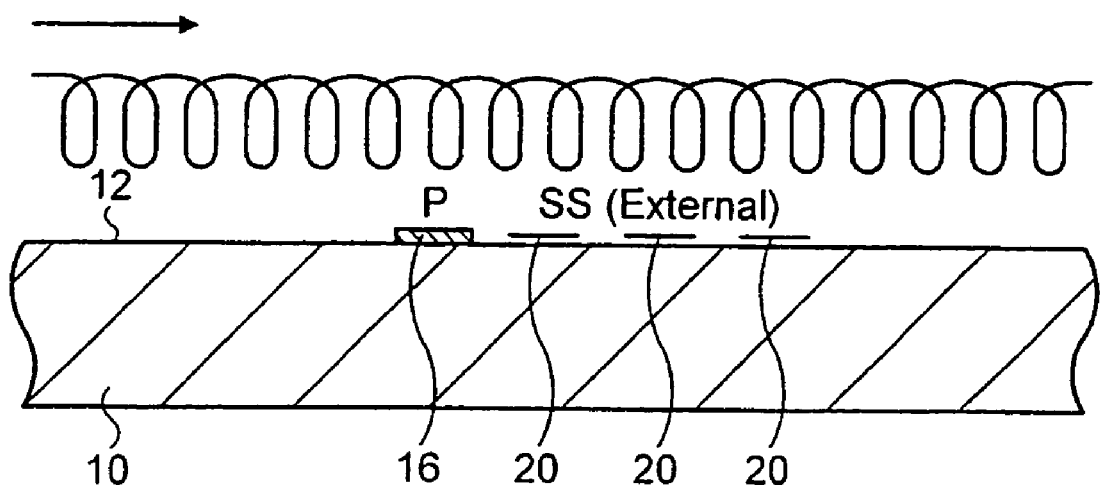
FIG. 3 is a diagrammatic view of a first sensor system according to the present invention.

Turning now to FIG. 3, a sensor system employing a local power generator as shown in FIG. 1 or 2 will be described. As shown, a series of solid state sensors 20 are mounted on or in the surface 12 of the panel 10 adjacent the piezo-electric device 16. The sensors 20 may, like the piezo-electric device 16, be mounted on the surface of the panel 10 or at least partially embedded in the surface of the panel 10. The sensors 20 may be arranged in a row or an array or randomly, but in each instance it is envisaged that a substantial number of them will be associated with the one piezo-electric device 16.

The sensors 20, the other circuit elements mounted on or in the surface 12, and the piezo-electric device 16 may all be formed by what is known as a "direct write" process on the surface 12. Such a process involves surface deposition techniques, such as ink jet printing, screen printing and maskless patterning, to apply layers of dissimilar materials to the surface. By the appropriate selection of such materials, and the interfaces between them, it is possible to form all of these electrical components, as well as the associated wiring, through such deposition techniques. Differing components simply require the selection of different material layers according to their function. Such components are cheap and easy to produce in relatively small volume and without the problems of added wiring and parasitic mass.

The piezo-electric device 16 may be cantilevered (not shown) above the surface 12, or above a cavity (not shown) formed in the surface 12, such that electrical energy is produced by the pressure and velocity of the boundary layer fluctuating and causing the piezo-electric cantilever to vibrate and so produce alternating electrical signals which can be extracted through an appropriate circuit. Whereas the devices described above are robust and simple to apply, this cantilever type of device produces more electrical power. It has been found that, in both cases, the incorporation of boundary flow disrupting elements such as protrusion 18 (see FIG. 2) increases local pressure and velocity fluctuations and thus enables significantly more electrical power to be generated. If the arrangement is such that the surface 12 adjacent to the device 16 is also able to vibrate under the fluid pressure and velocity fluctuations then this increases the electrical power generated—and this effect can be further increased by the use of appropriately shaped and located boundary flow disruption elements such as protrusion 18.

In an aircraft application, for example, it is envisaged that the entire surface 12, for example, the entire wing surface, might be covered with arrays of the sensors 20 each grouped around a respective piezo-electric device 16.

Figure 4:
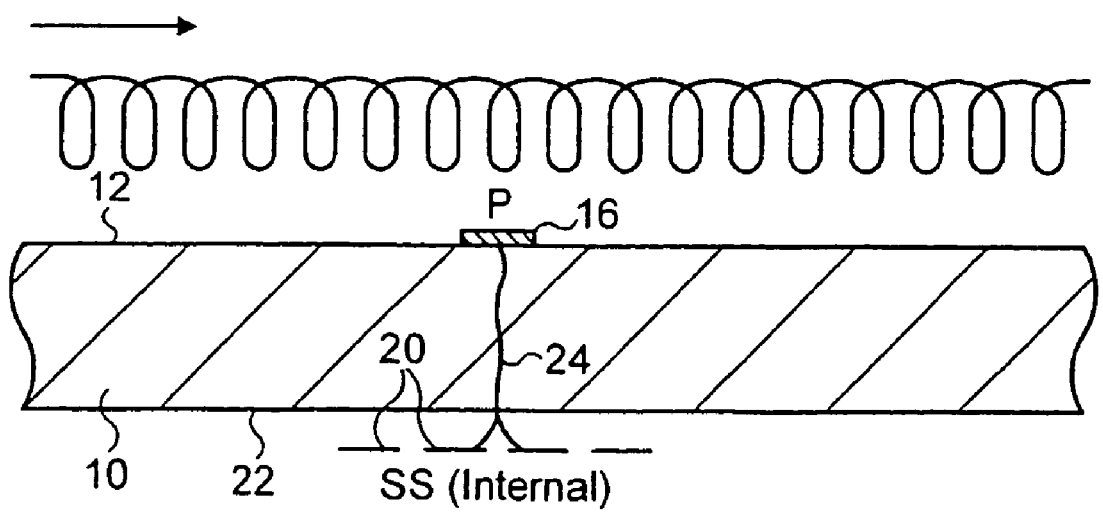
FIG. 4 is a diagrammatic view of a second sensor system according to the present invention.

It will be appreciated that it is equally possible as shown in FIG. 4 for the sensors 20 to be mounted instead on or in an internal surface 22 of the panel 10 facing the surface 12 on which the piezo-electric device 16 is provided. In this instance, a wire connection 24 will be provided through the interior of the panel 10 to connect the piezo-electric device 16 to the sensors 20. Further connections (not shown) between the sensors 20 and other circuit elements are then provided as before on the panel 10, on this occasion on the internal surface 22.

Figure 5:
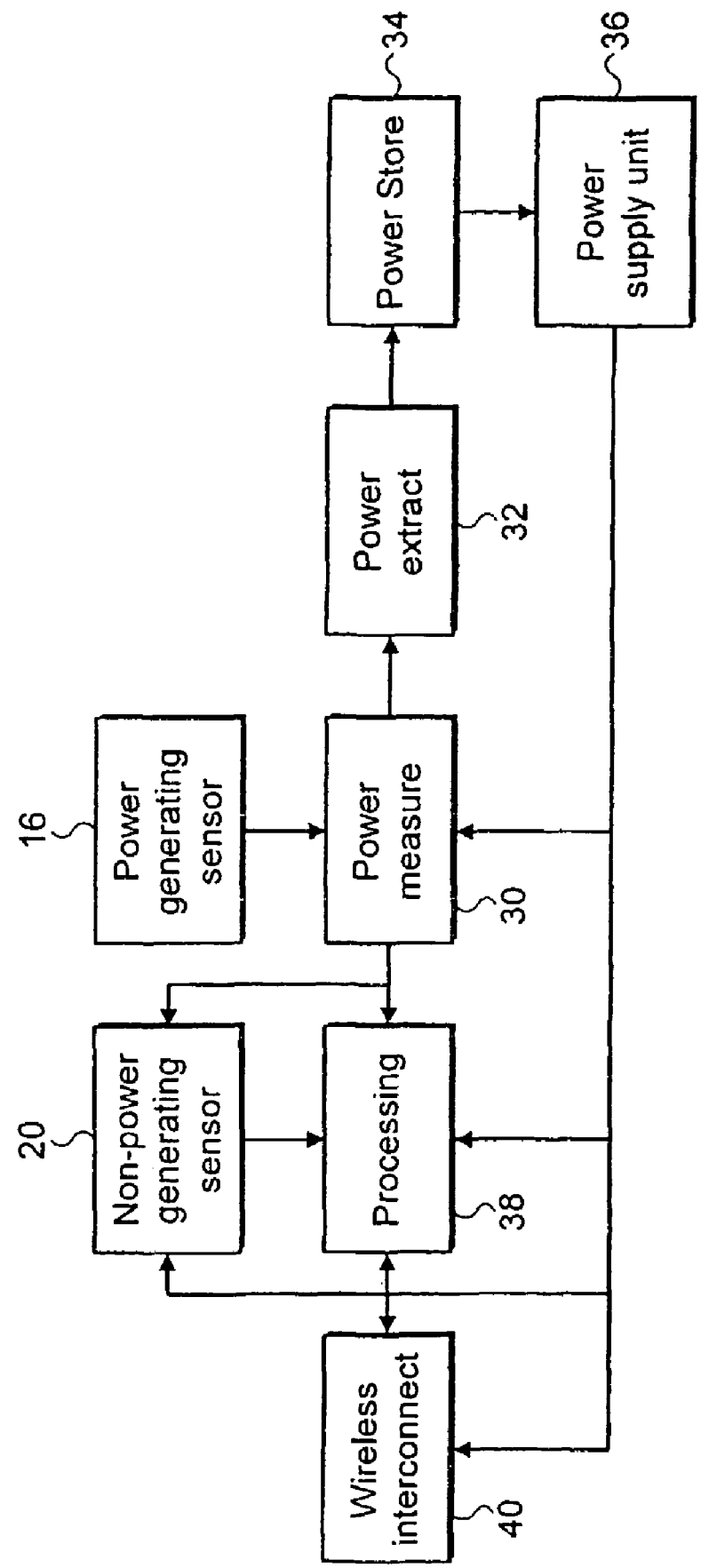
FIG. 5 is a block diagram of the sensor system of FIGS. 3 and 4.

Turning now to FIG. 5, the electrical circuitry of the sensor system will be described. As shown in FIG. 5, the piezo-electric device 16 acts not only as a power generator but also as a sensor in its own right, and is connected to a measuring circuit 30 for monitoring the amplitude of its electrical output. For example, the output of the device 16 may represent the amount of turbulence adjacent the wing of an aircraft and hence the velocity of the aircraft. The circuit 30 is connected to a circuit 32 such as a converter for converting the output received from the measuring circuit 30 into a form suitable for supply to a storage circuit 34, such as an integrator or capacitor or small chargeable battery for storing the electrical power. A power supply 36 is arranged to supply power from the store 34 for operation of the various elements of the sensor system.

FIG. 5 shows only one sensor 20 but it will be appreciated that there will in practice be a plurality of such sensors, as mentioned above. As shown in FIG. 5, each sensor 20 is arranged to receive power derived from the device 16 supplied from the power supply 36. The output of the sensor 20 is supplied to a processing circuit 38, which also receives the measuring output from the amplitude measuring circuit 30 and which is supplied with power from the power supply 36.

The processing circuit 38 is arranged to extract sensor information from the sensor signal output from the sensor 20 and from the measuring signal output from the measuring circuit 38 to convert this information into a form suitable for transmission to a remote source, such as a control unit of a monitoring, control or other operational system of the vehicle. The output from the processing circuit 38 is supplied to a communication device 40 operable to transmit the information by electromagnetic radiation to the remote source. In the present instance, the communication device 40 comprises a radio transmitter and receiver. As shown, the communication device 40 is also supplied with power from the power supply 36.

It will be understood that the entire sensor system is self contained and is mounted on the panel 10 of the vehicle, either on the external surface 12 which carries the piezo-electric device 16 or on the internal surface 22 opposite the surface 12 carrying the piezo-electric device 16.

It will also be appreciated that a number of modifications are possible within the scope of the invention.

For example, the present sensor system has been described in relation to a vehicle such as an aircraft, for travelling through air with the transducer being responsive to fluctuations in the boundary layer of air associated with an external surface of the vehicle. However, the invention is equally applicable to a sea vehicle such as a ship or submarine in which the fluid flowing over or past the vehicle is water.

The invention could also be applied to the detection of conditions in a combustion chamber of an engine combustion cylinder of a vehicle in order to supply sensor information for control of the fuel supply, for example.

The invention could equally well be applied to a fluid supply system, for example, for gas, water or oil, in which the fluid is conveyed to its destination through pipelines. In this instance, the transducer will be associated with an internal surface of one of the pipes.

The invention has been described in relation to the use of a transducer responsive to the turbulence in a boundary layer of fluid flowing over a surface, in other words to pressure fluctuations in this layer. It is equally possible to employ a transducer which is responsive to temperature fluctuations (or temperature differences) in this layer, for example, a thermo-electric device.

In this instance, a formation, such as the formation 18, could still be provided on the surface upstream of the thermoelectric device, this time in order to create a temperature difference by generating high and low pressure regions having correspondingly higher and lower temperatures respectively.

In the case of a transducer responsive to temperature fluctuations, a thermo-electric device may be employed comprising a thermo-couple or thermo-pile arranged on and/or within the panel 10 of the vehicle such that local hot and cold junctions respectively can be created due to variations in temperature either with time or with physical separation/distance. Such temperature variations may take place either in the fluid flowing over or past the vehicle or in the vehicle structure itself.

Other possibilities include the use of transducers responsive to vibrations in the panel on which they are mounted, for example, due to the fluid turbulence or to vibrations of machinery associated with the vehicle or to frictional engagement of parts of the vehicle with contact surfaces for example in the environment.

More especially, the device 16 may be responsive to a variety of external characteristics such as turbulence and incident radiation, a variety of internal characteristics such as vibration, strain and temperature, and equally a variety of cross-boundary characteristics such as differential temperature.

Likewise, the sensors 20 may be employed to measure external characteristics such as turbulence or incident radiation, and internal characteristics such as vibration, strain, electrical resistance and temperature.

The energy in such environmental fluctuations is generally relatively low but is more than adequate for generating the small amounts of power required by the present sensor system and communication device.

It will be understood that the electrical power generated from the transducer 16 may be employed directly and continuously, or it may be stored in the storage device 34 for intermittent use.

The communication means described with reference to FIG. 5 employs radio transmissions, but it could alternatively employ infrared transmissions or close coupling of electric or magnetic fields.

Whilst FIG. 5 shows only one device 16 and one sensor 20, it is to be understood that in practice, there may be a number of the devices 16, each supplying power to a group or array of the sensors 20 and to a respective communication device 40.

In this way, a very complex sensor system may be built up for supplying a substantial amount of sensor information to a remote processing unit of the vehicle. It is even possible with a sufficient number of such devices to set up an artificial neural network (ANN) including the remote central processing unit, in order to provide an information processing system which is adaptive according to sensed environmental conditions and which achieves this adaptation by iteratively adjusting the response to the received sensor information in the central processing unit.

A highly sophisticated monitoring or control system capable of dealing with complex control situations can thereby be implemented. This may be especially advantageous for specialised applications within the aircraft industry.

The present invention has a number of advantages, not the least of which are that it offers a simple, reliable and robust system for providing sensor information to a remote source such as a central control unit. Furthermore, this simple basic system is capable of expansion into complex and sophisticated forms, according to the application. The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Apparatus having a sensor system for providing sensor information for a monitoring, control or other operating function of the apparatus, the sensor system comprising:
   a transducer adapted to be responsive to a predetermined environmental characteristic of the apparatus for providing an electrical output;
   means for accentuating said environmental characteristic adjacent to the transducer;
   at least one sensor arranged to be operated by power derived from the electrical output for generating a detection signal; and
   means arranged to be operated by power derived from the electrical output and responsive to the detection signal, for communicating sensor information to a processing unit remote from the sensor system and associated with the said function.

2. Apparatus according to claim 1 in which the transducer is arranged to be responsive to at least one of: a boundary layer characteristic of fluid flowing over a surface of the apparatus, a structural characteristic of the apparatus, vibration in the apparatus, electro-magnetic radiation, and temperature or temperature difference within and/or adjacent to the apparatus.

3. Apparatus according to claim 1, in which the transducer comprises a solid state device.

4. Apparatus according to claim 3 in which the transducer comprises one of a piezo-electric device and a thermo-electric device.

5. Apparatus according to claim 1, in which the transducer constitutes a further sensor.

6. Apparatus according to claim 1, in which the transducer is provided on or at least partially embedded within a surface of the apparatus.

7. Apparatus according to claim 6, in which the at least one sensor is located on or at least partially embedded within the same or an opposed surface of the apparatus.

8. Apparatus according to claim 6, in which at least one of the transducer, the at least one sensor and the communication means is formed by layer deposition techniques on the or the associated surface of the apparatus.

9. Apparatus according to claim 8 in which at least one of the transducer, the at least one sensor and the communication means is formed by printing techniques on the or the associated surface of the apparatus.

10. Apparatus according to claim 6, in which at least some of the electrical connections within the sensor system are formed by layer deposition techniques on the or the associated surface of the apparatus.

11. Apparatus according to claim 6, in which at least some of the electrical connections within the sensor system are formed by printing techniques on the or the associated surface of the apparatus.

12. Apparatus according to claim 1, in which the transducer is provided on or at least partially embedded within a surface of the apparatus so as to be responsive to a predetermined characteristic of a boundary layer of fluid flowing over the surface.

13. Apparatus according to claim 12 wherein the accentuation means comprises a formation on or in the surface of the apparatus upstream of the transducer arranged so as to accentuate fluctuations in the boundary layer characteristic.

14. Apparatus according to claim 1, comprising a plurality of the sensors, and local power generation means for operating the sensors, said generation means including the transducer.

15. Apparatus according to claim 1, in which the communication means comprise means for transmitting and/or receiving electromagnetic radiation.

16. Apparatus according to claim 1, comprising a land, sea or air vehicle.

17. Apparatus according to claim 16 comprising an aircraft.

18. A sensor system for providing detection information for a monitoring, control or other operational function of an apparatus, comprising:
   a transducer adapted to be responsive to a predetermined environmental characteristic of the apparatus for providing an electrical output;
   means for accentuating said environmental characteristic adjacent to the transducer;
   at least one sensor arranged to be operated by power derived from the electrical output for generating a detection signal; and
   means arranged to be operated by power derived from the electrical output and responsive to the detection signal, for communicating sensor information to a processing unit of said apparatus and remote from the sensor system.

19. A sensor system for providing detection information for a monitoring, control or other operational function of apparatus subjected to fluid flow therein or thereover, comprising:
   a transducer adapted to be responsive to a predetermined characteristic of a boundary layer of the fluid for providing an electrical output;
   at least one sensor arranged to be operated by power derived from the electrical output for generating a detection signal; and
   means for accentuating said characteristic adjacent to the transducer.

20. A device for generating electrical power, said device being associated in use with a surface subjected to a fluid flow thereover, comprising:
   a transducer adapted to be responsive to a predetermined characteristic of a boundary layer of the fluid for generating an electrical output;
   means for supplying electrical power derived from the electrical output; and
   means for accentuating said characteristic of the boundary layer of the fluid adjacent to the transducer.

* * * * *